United States Patent [19]
Buer et al.

[11] Patent Number: 6,049,707
[45] Date of Patent: Apr. 11, 2000

[54] BROADBAND MULTICARRIER AMPLIFIER SYSTEM AND METHOD USING ENVELOPE ELIMINATION AND RESTORATION

[75] Inventors: Kenneth Vern Buer, Gilbert; Dean Lawrence Cook, Mesa, both of Ariz.

[73] Assignee: Motorola, Inc., Schaumburg, Ill.

[21] Appl. No.: 08/922,055

[22] Filed: Sep. 2, 1997

[51] Int. Cl.[7] .............................. H04B 1/04; H04B 11/12; H04K 1/02
[52] U.S. Cl. ........................... 455/314; 455/116; 455/126; 455/70; 455/12.1; 375/296; 375/297; 330/124; 330/136; 330/149
[58] Field of Search ........................... 455/314, 70, 12.1, 455/116, 126; 330/136, 149, 52, 124; 375/296, 58, 60, 297

[56] References Cited

U.S. PATENT DOCUMENTS

| | | |
|---|---|---|
| 4,460,897 | 7/1984 | Gans .......................................... 343/754 |
| 4,569,073 | 2/1986 | Kahn .......................................... 381/16 |
| 5,249,201 | 9/1993 | Posner et al. .............................. 375/59 |
| 5,263,194 | 11/1993 | Ragan ....................................... 455/316 |
| 5,436,592 | 7/1995 | Schlegl ....................................... 330/10 |
| 5,461,341 | 10/1995 | Schlegl ....................................... 330/10 |
| 5,838,193 | 11/1998 | Myers et al. .............................. 330/10 |
| 5,861,777 | 1/1999 | Sigmon et al. ......................... 330/136 |

*Primary Examiner*—Wellington Chin
*Assistant Examiner*—Sheila Smith
*Attorney, Agent, or Firm*—Gregory J. Gorrie

[57] ABSTRACT

An amplifier system (100) for transmitting wideband multicarrier communication signals in a satellite communication system uses wideband envelope elimination and restoration amplifiers (200). The system upconverts channelized IF signals to provide a wideband multicarrier RF output signal between 20 and 30 GHz having a bandwidth between 100 and 200 MHz.

35 Claims, 3 Drawing Sheets

16,049,707

BROADBAND MULTICARRIER AMPLIFIER SYSTEM AND METHOD USING ENVELOPE ELIMINATION AND RESTORATION

FIELD OF THE INVENTION

This invention relates in general to the field of communication systems, in particular to satellite communication systems that receive and transmit wideband multicarrier signals.

BACKGROUND OF THE INVENTION

In satellite communication systems, there is a need for highly efficient wideband microwave amplifier systems suitable for use in communications systems. This is especially true where power and available energy are limited. Accordingly, a premium is placed on amplifier efficiency. Various apparatus are available for amplifying signals. In communication systems which involve the amplification and transmission of modulated signals, many modulated signals contain information in the amplitude envelope and the phase of the signal, a premium is placed on the ability to create a high fidelity reproduction of the signal. In particular, it is very desirable for an amplifier to exhibit very low amplitude distortion and very low phase distortion. Low distortion allows for clearer and more reliable communications. High efficiency allows for operate longer battery life and reduced power consumption.

One method of achieving increased efficiency is to use envelope elimination and restoration (EER)-type amplifiers. One problem with EER-type amplifiers is that the available bandwidth of the amplifier is limited to approximately one-fifth of the pulse width modulator bandwidth used in these EER-type amplifiers. This has relegated the use of EER-type amplifiers to systems with voice channel bandwidths. Recent advances in modulator performance have pushed the bandwidth achievable by EER-type amplifiers up to several hundred kilohertz. This is far less than the bandwidth required for communication systems, especially cellular and satellite communication systems that transmit and receive multicarrier wideband signals at microwave frequencies. For modern satellite communication systems and future satellite communication systems, bandwidths of several hundred megahertz up to several gigaHertz are desirable.

Thus, what is needed is an improved wideband microwave communication system, that is highly efficient. What is also needed is a highly efficient method of amplifying wideband multicarrier signals suitable for satellite communication systems.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides a method and apparatus for providing a wide-band RF signal suitable for transmission in satellite communication systems. The wide-band RF signal is preferably a multi-carrier signal suitable for communicating with subscriber units such as radio telephones and mobile ground stations. In the preferred embodiments, the amplifier system uses wideband envelope elimination and restoration amplifiers. The system upconverts channelized IF signals to provide a wideband multicarrier RF output signal between 20 and 30 GHz having a bandwidth between 100 and 200 MHz.

Figure 1:
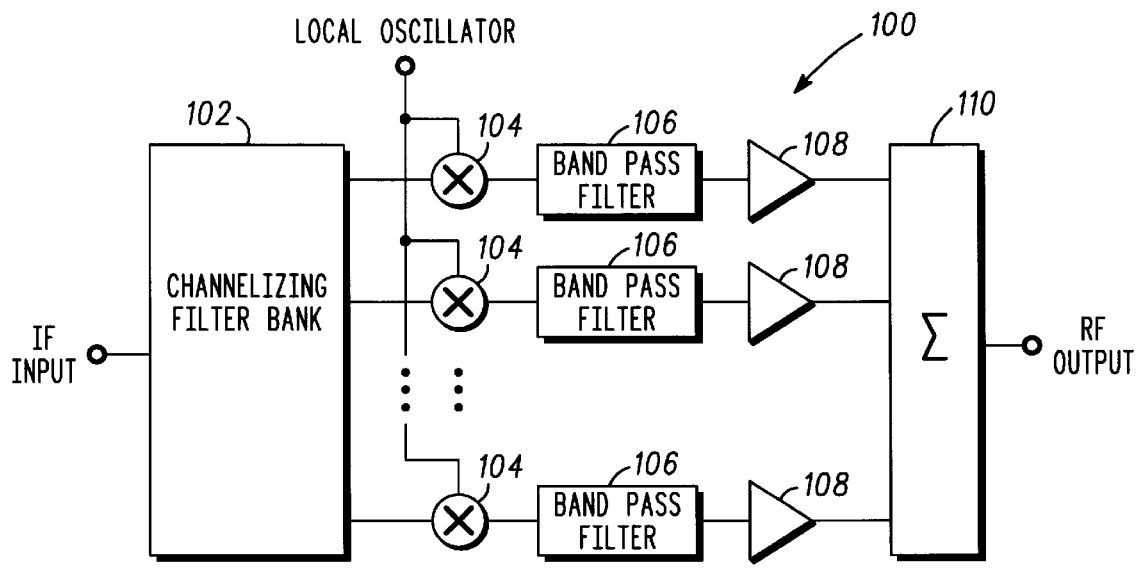
FIG. 1 is a simplified block diagram of a broadband multichannel amplifier system in accordance with a first embodiment of the present invention.

FIG. 1 is a simplified block diagram of a broadband multi-channel amplifier system in accordance with a first embodiment of the present invention. Amplifier system 100 provides a RF output in the range of 20–30 gigaHertz with a bandwidth of approximately 100 to 200 megahertz. The RF output signal preferably contains between 100 and 200 channels, each channel being separated by between 1 and 2 megahertz. In the preferred embodiment, the IF input to amplifier system 100 is between 3–6 gigaHertz.

Amplifier system 100 includes channeling filter bank 102 for separating a wideband IF signal into smaller bandwidth signals. The wideband IF signal is preferably a multi-carrier signal. Each smaller bandwidth signal is preferably separated in center frequency by approximately 1 or 2 megahertz. The narrowband IF signals provided by filter bank 102 are each upconverted by one or more mixing elements 104. Although one mixer per channel may be used, it is preferred that a superheterodyne system comprised of two mixers per channel be used to upconvert each of the narrow band IF signals. In the preferred embodiment, there may be as many as 100–200 mixing elements 104, each mixing element providing upconversion for one channel's IF signal. Mixing elements 104 convert the narrowband IF signals to signals in the desired RF frequency range.

Bandpass filters 106 are used to filter the RF signals provided by mixing elements 104. Bandpass filters 106, among other things, filter out undesired mixing products produced by mixing elements 104. Amplifier system 100 also comprises a plurality of envelope elimination and restoration (EER) amplifiers 108 for amplification of each of the narrowband RF signals provided by filters 106. Each of the amplified narrowband RF signals is combined in summer 110 to provide a single wideband RF output signal. The wideband RF output signal preferably has a carrier for each of the RF frequencies provided by each EER amplifier 108. In the preferred embodiment, EER amplifiers 108 have an amplification bandwidth of approximately one to two megahertz for providing an RF output signal of 100 to 200 megahertz when 100 EER amplifiers are used. More channels of a lesser bandwidth, which include mixing element 104, filter 106, and EER amplifier 108 may also be used.

Figure 2:
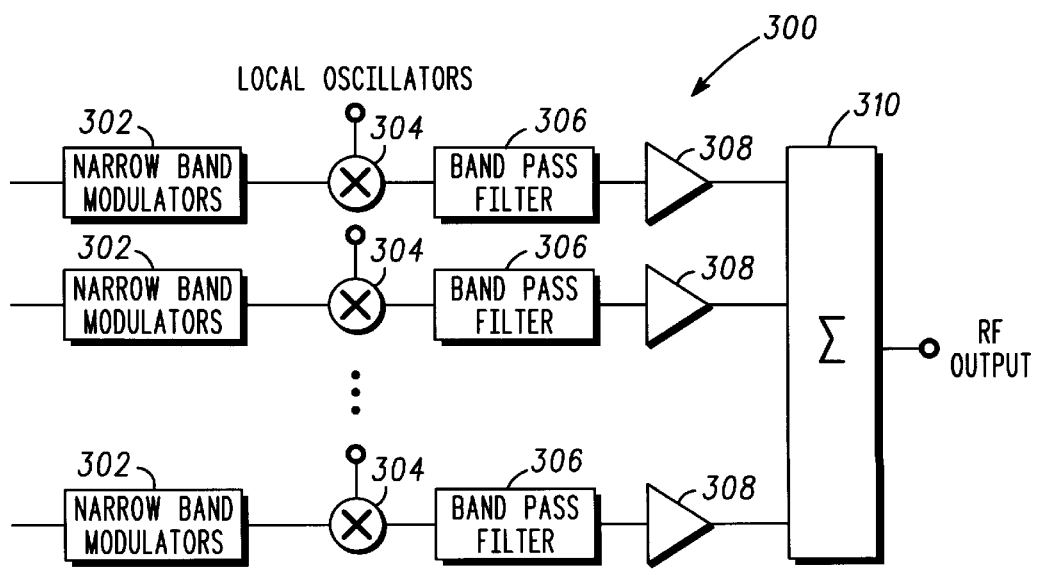
FIG. 2 is a simplified block diagram of a broadband multichannel amplifier system in accordance with a second embodiment of the present invention.

FIG. 2 is a simplified block diagram of a broadband multi-carrier amplifier system in accordance with a second embodiment of the present invention. Amplifier system 300, similar to amplifier system 100, provides a broadband multi-carrier RF output signal suitable for transmission by satellites of a satellite communication system for communication with ground based subscriber units. Amplifier system 300 includes a plurality of narrowband modulators, preferably digital modulators such as QPSK modulators, for modulating a digital bit stream that represents voice or data. Each narrowband modulator 302 provides a modulated IF carrier signal at the same carrier frequency. Each narrowband modulator 302 provides a narrowband IF signal. Amplifier system 300 also includes a plurality of mixing elements 304 for upconverting the narrowband IF signals to an RF frequency. In the preferred embodiment, each mixing element is provided with an local oscillator (LO) signal offset in frequency from that of other mixing elements. Preferably each LO signal is offset in frequency by approximately 1 megahertz. Accordingly, when there are 100 mixing elements, the output of the mixing elements is a plurality of RF signals each offset by one megahertz. In the preferred embodiment, the LO signals are generated by a comb generator, however other multiple harmonic devices may also be used. In a preferred embodiment, mixing elements are comprised of superhetrodyne mixers having at least two upconversion stages.

The RF signals produced by mixing elements 304 are filtered with bandpass filters 306 which filter out undesired mixing products produced during the upconverting process. Each narrowband RF signal is amplified in one EER-type amplifier 308 and combined in summer 310 to produce a wideband RF output signal. The bandwidth of RF output signal is determined by the number of channel elements of amplifier system 300 and the bandwidth of each channel. In the preferred embodiment, each EER-type amplifier 308 has a bandwidth of one to two megahertz and the LO frequencies are offset by about 1 megahertz. Accordingly the RF output bandwidth is approximately between 100 and 200 megahertz when 100 of each of narrowband modulators 302, mixing elements 304, bandpass filters 306 and EER-type amplifiers 308 are used.

Figure 3:
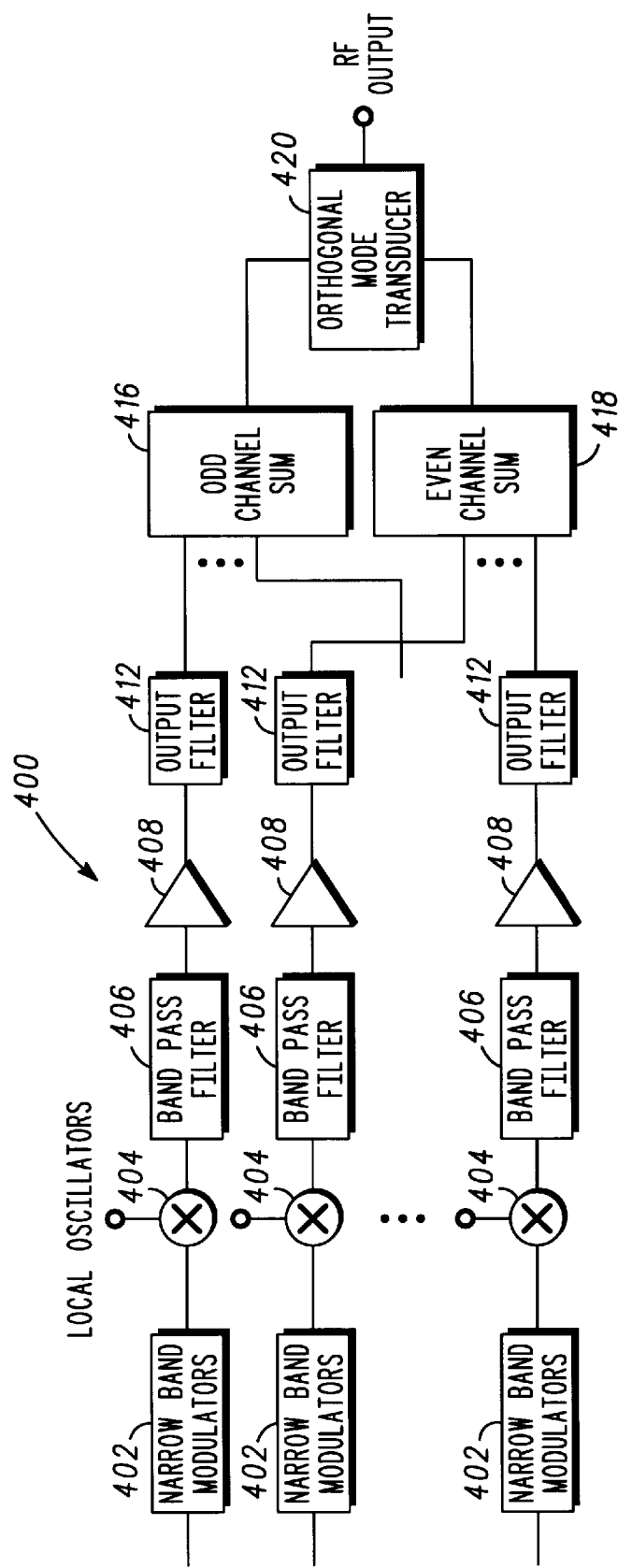
FIG. 3 is a simplified block diagram of a broadband multichannel amplifier system in accordance with a third embodiment of the present invention.

FIG. 3 is a simplified block diagram of a broadband multi-carrier amplifier system in accordance with a third embodiment of the present invention. Amplifier system 400 includes a plurality of narrowband modulators, each for modulating a digital bit stream that contains, for example, voice or data information. In the preferred embodiment, narrowband modulators 402 modulate the digital information onto a carrier in the range of 3–6 gigaHertz. A low frequency modulator along with one or more unponvert steps may be used to generate the 3–6 GHz modulated carriers. In the preferred embodiment, there are approximately 100 narrowband modulators 402, each providing a bandwidth of approximately one to two megahertz. Amplifier system 400 also includes a plurality of mixing elements 404 for upconverting the IF carrier signals provided by narrowband modulators 402 to an RF frequency in the range of 20–30 gigaHertz. In the preferred embodiment, each mixing element is provided a different LO frequency which is offset a predetermined amount from the other LO frequencies. Accordingly, the output of mixing elements 404 is a plurality of RF signals each offset by the LO frequency offset. The narrowband RF signals are filtered by bandpass filters 406 to reduce or eliminate unwanted mixing products produced by mixing elements 404. Each narrowband RF signal is amplified with EER-type amplifier 408 which preferably has a bandwidth between 1–2 megahertz. In one preferred embodiment, the amplified narrowband RF signals are filtered with output filters 412 to reject out-of-band spurious signals created by nonlinearities in EER-type amplifiers 408.

Amplifier system 400 also includes odd channel summer 416 and even channel summer 418 for summing the odd and even respective channel signals produced by EER-type amplifiers 408. Amplifier system 400 also includes an orthogonal mode transducer 420 for combining the odd channel signals and even channel signals provided by odd channel summer 416 and even channel summer 418 respectively. Orthogonal mode transducer 420 produces a wideband RF output signal here every other channel is a different polarization from the adjacent channels. Preferably the odd and even channels have an orthogonal polarization with respect to each other.

In the preferred embodiment, every other channel is a different polarization which allows output filters 412 to be easier realized. The use of polarization diversity provides at least 20 dB of adjacent channel rejection while filtering reject channels more than one channel away from frequency.

Amplifier systems 100, 300, and 400 are preferably fabricated using several MCM (multi chip modules). In the preferred embodiment there are several channels fabricated per MCM.

Figure 4:
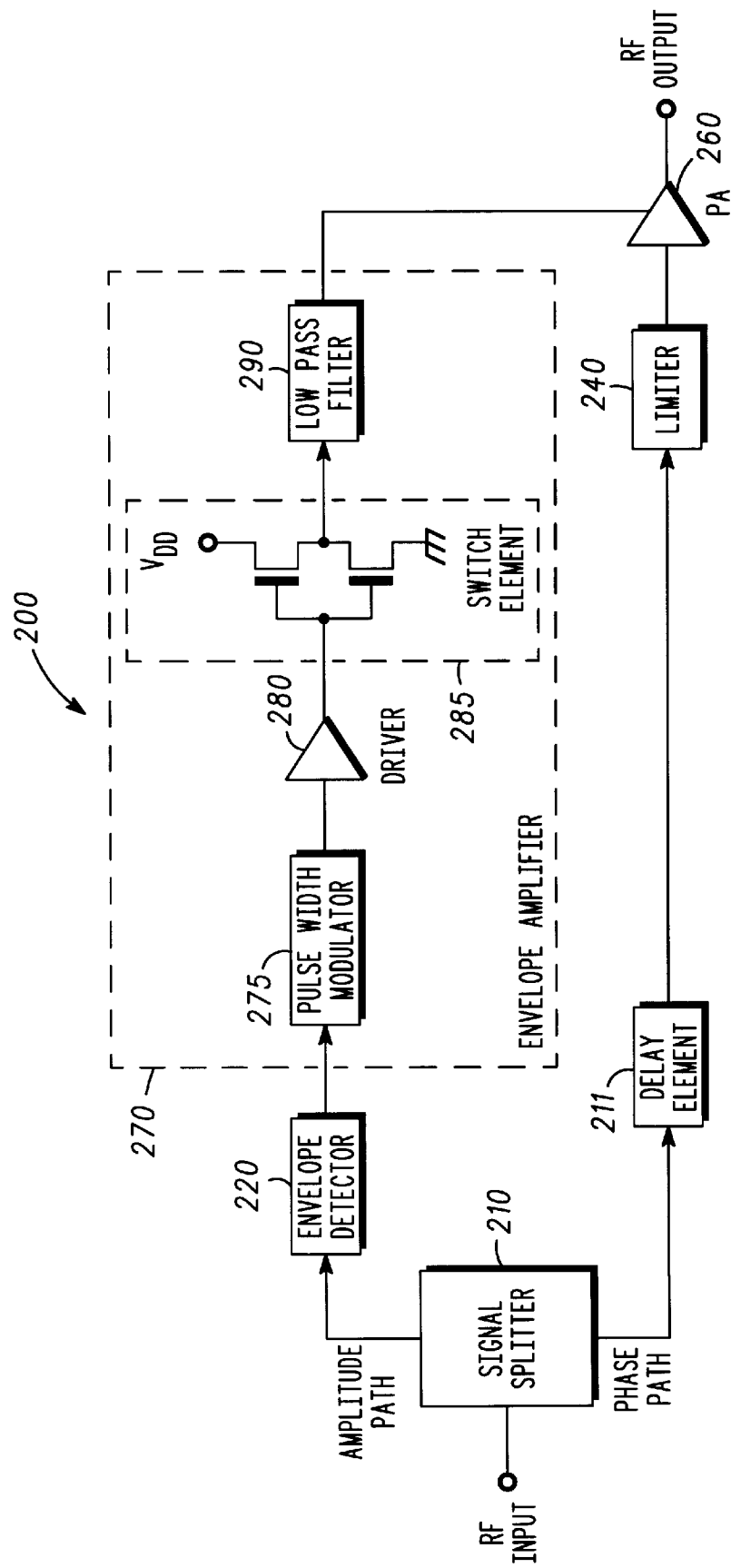
FIG. 4 is a simplified block diagram of an envelope elimination and restoration (EER)-type amplifier suitable for use with the embodiments of the present invention.

FIG. 4 is a simplified block diagram of an envelope elimination and restoration (EER)-type amplifier suitable for use with the embodiments of the present invention. EER-type amplifiers such as the one shown in FIG. 4 are recognized as high efficiency amplifiers. EER-type amplifier 200 includes signal splitter 210, delay element 211, envelope detector 220, envelope amplifier 270, limiter 240, and power amplifier 260. EER-type amplifier 200 receives an RF input into signal splitter 210. Signal splitter 210 splits the RF input signal into an amplitude path signal which feeds envelope detector 220, and a phase path signal which feeds delay element 211 and limiter 240. Delay element 211 performs a time delay function to delay the phase path signal. Delay element 211 functions to balance the delay in the amplitude and phase paths. The time delay element may be implemented elsewhere in EER-type amplifier 200.

The phase path of EER-type amplifier 200 includes limiter 240 and power amplifier 260. Limiter 240 receives the signal output from signal splitter 210 and delay element 211 and amplitude limits the signal. Limiter 240 preferably performs hard limiting so that the output of limiter 240 contains phase information with little or no amplitude information. After limiting, with the amplitude information removed, the resultant signal is the phase modulated carrier. The phase modulated carrier output from limiter 240 is input to power amplifier 260. Power amplifier 260 is any amplifier stage capable of being modulated, and it is preferably a field effect transistor (FET) amplifier. The drain of the FET is conventionally connected to a DC power source, however, as will be discussed below, in a preferred embodiment exemplified herein, the drain of the FET is driven with a signal, resulting in an amplitude modulated output signal.

The amplitude path of EER-type amplifier 200 includes envelope detector 220 and envelope amplifier 270. Envelope detector 220 detects the envelope of the RF input signal and outputs an envelope signal which represents the amplitude information contained in the original RF input signal. Envelope detector 220 is preferably a diode detector; however, other types of detectors, such as a synchronous detector based upon a double balanced mixer, could be used.

Envelope amplifier 270 amplifies the envelope signal output from envelope detector 220 and drives the drain bias of power amplifier 260. Envelope amplifier 270 amplifies the envelope signal to a level commensurate with the desired output. The output of the envelope amplifier is the power supply for power amplifier 260, and the resultant remodulation of the phase modulated carrier restores the envelope, producing an amplified replica of the input signal.

EER-type amplifier 200 varies the drain bias of power amplifier 260 in such a way as to maintain operation near saturation and therefore in a region of high efficiency. Because the highly efficient power amplifier 260 consumes the majority of the power consumed in EER-type amplifier 200, the entire circuit is considerably more efficient than conventional amplifiers.

Because envelope amplifier 270 only needs to operate on the bandwidth of the envelope rather than at the much higher RF bandwidth of the RF amplifier, envelope amplifier 270 can be an inexpensive and efficient amplifier with lower bandwidth requirements. One skilled in the art will recognize that there are many possible ways to implement envelope amplifier 270, but in a preferred embodiment, envelope amplifier 270 is a class S amplifier.

Envelope amplifier 270 includes pulsewidth modulator (PWM) 275, driver 280, switching element 285, and low pass filter 290. PWM 275 performs pulsewidth modulation of the envelope signal input to envelope amplifier 270 to produce a pulsewidth modulated signal which has a duty cycle proportional to the amplitude of the envelope signal. The pulsewidth modulated signal is then fed to driver 280. Switching element 285 and low pass filter 290, in response to driver 280, produce a signal that is an amplified version of the input to envelope amplifier 270. Switching element 285 is preferably comprised of two switching transistors.

In operation, EER-type amplifiers may exhibit a significant time delay in the envelope amplifier because of the delay introduced in the low pass filter following the pulsewidth modulator. For example, in a system having an envelope bandwidth of between 10 MHz and 30 MHz, typical delays in the low pass filter range from 10 ns to 45 ns.

Components in the phase path of EER-type amplifiers introduce small amounts of delay, but their sum is generally substantially less than that of the low pass filter in the amplitude path. In order to recombine the envelope in the amplitude path with the carrier in the phase path without introducing significant distortion, the delay in the two paths should be substantially matched.

The degree to which the delays in the amplitude path and phase path of the EER-type amplifier should be matched is dependent, in part, on the desired signal fidelity at the output. The closer the delay is matched, the higher the fidelity will be at the output. In a preferred embodiment, the differential delay is between 10 ns and 50 ns, and the delays are desirably matched to within 1 ns to 4 ns, depending on the switching frequency of the envelope amplifier.

In one embodiment of the present invention, signal splitter 210 and delay element 211 are implemented with a SAW device having multiple output taps, each exhibiting a different delay from input to output. SAW delay lines typically have total delays on the order of microseconds, however, the differential delay between the output taps can be on the order of nanoseconds. Because in this embodiment of the present invention, the delay matching is accomplished by utilizing a SAW delay line with multiple output taps, the separate time delay element may be advantageously omitted. By utilizing a SAW delay line, a delay matching mechanism is capable of accommodating various delay characteristics, including a differential delay from 10 ns to 50 ns with an accuracy of 1 ns to 4 ns.

In another embodiment of the present invention, a non-SAW delay element is implemented in the phase path only. Such a delay element may be implemented with coax cable or by inductor capacitor (LC) delay lines.

Accordingly, the present invention provides a highly wideband microwave system suitable of use in satellite communications, among other things, that is both highly efficient and has wide bandwidths.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for transmitting a wideband multicarrier RF signal comprising the steps of:

separating a multicarrier IF signal into a plurality of narrowband IF signals using a channelizing filter bank;

upconverting each narrowband IF signal to an RF frequency to provide a plurality of narrowband RF signals, each narrowband RF signal of the plurality having a different carrier frequency;

filtering each narrowband RF signal with a band pass filter;

amplifying each narrowband RF signal with an envelope elimination and restoration (EER) amplifier to produce a plurality of amplified narrowband RF signals; and summing each amplified narrowband RF signal to produce the wideband multicarrier RF signal comprised of the narrowband RF signals of said different carrier frequencies.

2. A method as claimed in claim 1 wherein the amplifying step comprises the steps of:

splitting each narrowband RF signal into an amplitude path signal and a phase path signal;

detecting an envelope of said amplitude path signal to provide an envelope signal;

amplitude limiting said phase path signal to provide a phase modulated carrier signal; and amplifying, in accordance with said envelope signal, said phase modulated carrier signal to produce one of said amplified narrowband RF signals, each one of said amplified narrowband RF signals having said different carrier frequency.

3. A method for providing a wideband RF signal comprising the steps of:

separating a multicarrier IF signal into a plurality of narrowband IF signals using a channelizing filter bank;

upconverting each narrowband IF signal to an RF frequency to provide a plurality of narrowband RF signals;

filtering each narrowband RF signal with a band pass filter;

amplifying each narrowband RF signal with an envelope elimination and restoration (EER) amplifier to produce a plurality of amplified narrowband RF signals; and summing each amplified narrowband RF signal to produce a wideband RF output signal, and wherein the amplifying step comprises the steps of:

splitting each narrowband RF signal into an amplitude path signal and a phase path signal;

detecting an envelope of said amplitude path signal to provide an envelope signal;

amplitude limiting said phase path signal to provide a phase modulated carrier signal; and amplifying, in accordance with said envelope signal, said phase modulated carrier signal to produce one of said amplified narrowband RF signals, and wherein the method further comprising the steps of:

performing a pulse width modulation on said envelope signal to produce a pulse width modulated signal having a duty-cycle proportional to an amplitude of said envelope signal;

driving switching transistors with said pulse width modulated signal to produce a switched signal;

filtering said switched signal with a low pass filter to provide an amplified version of said envelope signal; and amplifying, in accordance with said amplified version of said envelope signal, said phase modulated carrier signal to produce one of said amplified narrowband RF signals.

4. A method for providing a wideband RF signal comprising the steps of:

separating a multicarrier IF signal into a plurality of narrowband IF signals using a channelizing filter bank;

upconverting each narrowband IF signal to an RF frequency to provide a plurality of narrowband RF signals;

filtering each narrowband RF signal with a band pass filter;

amplifying each narrowband RF signal with an envelope elimination and restoration (EER) amplifier to produce a plurality of amplified narrowband RF signals; and summing each amplified narrowband RF signal to produce a wideband RF output signal, wherein the amplifying step comprises the steps of:

splitting each narrowband RF signal into an amplitude path signal and a phase path signal;

detecting an envelope of said amplitude path signal to provide an envelope signal;

amplitude limiting said phase path signal to provide a phase modulated carrier signal; and amplifying, in accordance with said envelope signal, said phase modulated carrier signal to produce one of said amplified narrowband RF signals, and wherein said multicarrier IF signal includes frequencies between three and six gigaHertz, and wherein the separating step includes the step of separating said multicarrier IF signal into narrowband IF signals, each narrowband IF signal being offset in frequency by between one and two megahertz, and wherein said wideband RF signal is between twenty and thirty gigaHertz.

5. A method as claimed in claim 2 wherein the filtering step includes the step of reducing LO signals present and sideband harmonic signals resulting from the upconverting step.

6. A method for providing a wideband RF signal comprising the steps of:

separating a multicarrier IF signal into a plurality of narrowband IF signals using a channelizing filter bank;

upconverting each narrowband IF signal to an RF frequency to provide a plurality of narrowband RF signals;

filtering each narrowband RF signal with a band pass filter;

amplifying each narrowband RF signal with an envelope elimination and restoration (EER) amplifier to produce a plurality of amplified narrowband RF signals; and summing each amplified narrowband RF signal to produce a wideband RF output signal, wherein the amplifying step comprises the steps of:

splitting each narrowband RF signal into an amplitude path signal and a phase path signal;

detecting an envelope of said amplitude path signal to provide an envelope signal;

amplitude limiting said phase path signal to provide a phase modulated carrier signal; and amplifying, in accordance with said envelope signal, said phase modulated carrier signal to produce one of said amplified narrowband RF signals, and wherein the method is performed by a satellite having an antenna, and wherein the method further comprises the step of transmitting said wideband RF output signal to earth for receipt by individual subscriber units.

7. A method as claimed in claim 6 wherein the multicarrier IF signal includes voice information from telephone conversations, and wherein said individual subscriber units include radio telephones.

8. A method as claimed in claim 2 wherein the filtering step includes the step of filtering each narrowband RF signal to reduce mixing products produced during the upconverting step.

9. A method for providing a wideband RF signal comprising the steps of:

modulating a plurality of digital bit streams to produce a plurality of modulated narrowband IF signals;

upconverting each of said modulated narrowband IF signals to an RF frequency to provide a plurality of narrowband RF signals;

filtering each narrowband RF signal with a band pass filter;

amplifying each narrowband RF signal with an envelope elimination and restoration (EER) amplifier to produce a plurality of amplified narrowband RF signals; and summing each amplified narrowband RF signal to produce a wideband RF output signal.

10. A method as claimed in claim 9 wherein the modulating step, each of the digital bit streams is modulated in a QPSK modulator to an IF frequency, each modulated narrowband IF signal having the same IF frequency, and wherein the upconverting step is performed on each modulated narrowband IF signal using local oscillator signals offset in frequency.

11. A method as claimed in claim 10 further comprises the step of generating said local oscillator signals using a comb generator.

12. A method as claimed in claim 9 wherein the amplifying step comprises the steps of:

splitting each narrowband RF signal into an amplitude path signal and a phase path signal;

detecting an envelope of said amplitude path signal to provide an envelope signal;

amplitude limiting said phase path signal to provide a phase modulated carrier signal; and amplifying, in accordance with said envelope signal, said phase modulated carrier signal to produce one of said amplified narrowband RF signals.

13. A method as claimed in claim 12 further comprising the steps of:
performing a pulse width modulation on said envelope signal to produce a pulse width modulated signal having a duty-cycle proportional to an amplitude of said envelope signal;
driving switching transistors with said pulse width modulated signal to produce a switched signal;
filtering said switched signal with a low pass filter to provide an amplified version of said envelope signal; and
amplifying, in accordance with said amplified version of said envelope signal, said phase modulated carrier signal to produce one of said amplified narrowband RF signals.

14. A method as claimed in claim 12 wherein said modulated narrowband IF signals includes frequencies between three and six gigaHertz having a bandwidth between one and two megahertz, and wherein said wideband RF signal is between twenty and thirty gigaHertz.

15. A method as claimed in claim 12 wherein the filtering step includes the step of reducing LO signals present and sideband harmonic signals resulting from the upconverting step.

16. A method as claimed in claim 12 wherein the method is performed by a satellite having an antenna, and wherein the method further comprises the step of transmitting said wideband RF output signal to earth for receipt by individual subscriber units.

17. A method as claimed in claim 16 wherein the digital bit streams include voice information from telephone conversations, and wherein said individual subscriber units include radio telephones.

18. A method as claimed in claim 12 wherein the filtering step includes the step of filtering each narrowband RF signal to reduce mixing products produced during the upconverting step.

19. A method for providing a wideband RF signal comprising the steps of:
modulating a plurality of digital bit streams to produce a plurality of modulated narrowband IF signals;
upconverting each of said modulated narrowband IF signals to an RF frequency to provide a plurality of narrowband RF signals;
filtering each narrowband RF signal with a band pass filter;
amplifying each narrowband RF signal with an envelope elimination and restoration (EER) amplifier to produce a plurality of amplified narrowband RF signals; and
combining odd and even channels of said narrowband RF signals in an orthogonal mode transducer to produce said wideband RF signal, said odd and even channels having orthogonal polarizations.

20. A method as claimed in claim 19 further comprising the step of filtering each amplified narrowband RF signal to reduce out-of-band spurious signals, said out-of-band spurious signals being created by non-linearities in said EER amplifier.

21. A method as claimed in claim 19 wherein the modulating step, each of the digital bit streams is modulated in a QPSK modulator to an IF frequency, each modulated narrowband IF signal having the same IF frequency, and wherein the upconverting step is performed on each modulated narrowband IF signal using local oscillator signals offset in frequency.

22. A method as claimed in claim 21 further comprises the step of generating different local oscillator signals using a comb generator.

23. A method as claimed in claim 19 wherein the amplifying step comprises the steps of:
splitting each narrowband RF signal into an amplitude path signal and a phase path signal;
detecting an envelope of said amplitude path signal to provide an envelope signal;
amplitude limiting said phase path signal to provide a phase modulated carrier signal; and
amplifying, in accordance with said envelope signal, said phase modulated carrier signal to produce one of said amplified narrowband RF signals.

24. A method as claimed in claim 23 further comprising the steps of:
performing a pulse width modulation on said envelope signal to produce a pulse width modulated signal having a duty-cycle proportional to an amplitude of said envelope signal;
driving switching transistors with said pulse width modulated signal to produce a switched signal;
filtering said switched signal with a low pass filter to provide an amplified version of said envelope signal; and
amplifying, in accordance with said amplified version of said envelope signal, said phase modulated carrier signal to produce said amplified narrowband RF signal.

25. A method as claimed in claim 23 wherein said modulated narrowband IF signals includes frequencies between three and six gigaHertz having a bandwidth between one and two megahertz, and wherein said wideband RF signal is between twenty and thirty gigaHertz.

26. A method as claimed in claim 23 wherein the filtering step includes the step of reducing LO signals present and sideband harmonic signals resulting from the upconverting step.

27. A method as claimed in claim 23 wherein the method is performed by a satellite having an antenna, and wherein the method further comprises the step of transmitting said wideband RF signal to earth for receipt by individual subscriber units.

28. A method as claimed in claim 27 wherein the multi-carrier IF signal includes voice information from telephone conversations, and wherein said individual subscriber units include radio telephones.

29. A method as claimed in claim 23 wherein the filtering step includes the step of filtering each narrowband RF signal to reduce mixing products produced during the upconverting step.

30. An amplifier system for transmitting a wideband multicarrier RF signal comprising:
an upconverter upconverting each of a plurality of narrowband IF signals to an RF frequency to provide a plurality of narrowband RF signals, each narrowband RF signal of the plurality having a different carrier frequency;
a band-pass-filter for filtering each narrowband RF signal;
an envelope elimination and restoration (EER) amplifier for amplifying each narrowband RF signal to produce a plurality of amplified narrowband RF signals; and
a summer for summing each amplified narrowband RF signal to produce the wideband multicarrier RF signal comprised of the narrowband RF signals of said different carrier frequencies.

31. An amplifier system for providing a wideband RF signal comprising:
   an upconverter upconverting each of a plurality of narrowband IF signals to an RF frequency to provide a plurality of narrowband RF signals;
   a band-pass-filter for filtering each narrowband RF signal;
   an envelope elimination and restoration (EER) amplifier for amplifying each narrowband RF signal to produce a plurality of amplified narrowband RF signals;
   a summer for summing each amplified narrowband RF signal to produce a wideband RF output signal; and
   a channelizing filter bank for separating a multicarrier IF signal into said plurality of narrowband IF signals.

32. An amplifier system for providing a wideband RF signal comprising:
   an upconverter upconverting each of a plurality of narrowband IF signals to an RF frequency to provide a plurality of narrowband RF signals;
   a band-pass-filter for filtering each narrowband RF signal;
   an envelope elimination and restoration (EER) amplifier for amplifying each narrowband RF signal to produce a plurality of amplified narrowband RF signals;
   a summer for summing each amplified narrowband RF signal to produce a wideband RF output signal; and
   a plurality of narrowband modulators for modulating a plurality of digital bit streams to produce said plurality of narrowband IF signals.

33. An amplifier system for providing a wideband RF signal comprising:
   an upconverter upconverting each of a plurality of narrowband IF signals to an RF frequency to provide a plurality of narrowband RF signals;
   a band-pass-filter for filtering each narrowband RF signal;
   an envelope elimination and restoration (EER) amplifier for amplifying each narrowband RF signal to produce a plurality of amplified narrowband RF signals; and
   a summer for summing each amplified narrowband RF signal to produce a wideband RF output signal,
   wherein the EER amplifier comprises:
   a splitter splitting each narrowband RF signal into an amplitude path signal and a phase path signal;
   a detector detecting an envelope of said amplitude path signal to provide an envelope signal;
   a limiter amplitude limiting said phase path signal to provide a phase modulated carrier signal; and
   an amplifier for amplifying, in accordance with said envelope signal, said phase modulated carrier signal to produce one of said amplified narrowband RF signals.

34. An amplifier system as claimed in claim 33 wherein the EER amplifier further comprises:
   a pulse width modulator for performing a pulse width modulation on said envelope signal to produce a pulse width modulated signal having a duty-cycle proportional to an amplitude of said envelope signal;
   switching transistors for being driven with said pulse width modulated signal to produce a switched signal;
   a filter for filtering said switched signal with a low pass filter to provide an amplified version of said envelope signal; and
   an amplifier amplifying, in accordance with said amplified version of said envelope signal, said phase modulated carrier signal to produce one of said amplified narrowband RF signals.

35. An amplifier system as claimed in claim 33 wherein said narrowband IF signals include frequencies between three and six gigaHertz, each having a bandwidth of between one and two megahertz, and wherein said wideband RF signal is between twenty and thirty gigaHertz.

* * * * *